United States Patent
Iwasaki

(10) Patent No.: US 11,517,131 B2
(45) Date of Patent: Dec. 6, 2022

(54) COVER, AND BEVERAGE CONTAINER COMPRISING SAME

(71) Applicant: IWASAKI INDUSTRY INC., Yamato-koriyama (JP)

(72) Inventor: Yoshihisa Iwasaki, Yamato-koriyama (JP)

(73) Assignee: IWASAKI INDUSTRY INC., Yamato-Koriyama (JP)

(*) Notice: Subject to any disclaimer, the term of this patent is extended or adjusted under 35 U.S.C. 154(b) by 264 days.

(21) Appl. No.: 16/753,419

(22) PCT Filed: Oct. 4, 2018

(86) PCT No.: PCT/JP2018/037189
§ 371 (c)(1),
(2) Date: Apr. 3, 2020

(87) PCT Pub. No.: WO2019/070022
PCT Pub. Date: Apr. 11, 2019

(65) Prior Publication Data
US 2020/0253399 A1 Aug. 13, 2020

(30) Foreign Application Priority Data
Oct. 6, 2017 (JP) .............................. JP2017-196078

(51) Int. Cl.
*A47G 19/12* (2006.01)
*B65D 47/08* (2006.01)
(Continued)

(52) U.S. Cl.
CPC ............. *A47G 19/12* (2013.01); *B65D 39/08* (2013.01); *B65D 47/08* (2013.01); *B65D 53/02* (2013.01);
(Continued)

(58) Field of Classification Search
CPC .. A47G 19/12; A47G 1/12; A47G 1/14; A47J 41/0027; A47J 41/0016; A47J 41/0022;
(Continued)

(56) References Cited

U.S. PATENT DOCUMENTS 486,298 A * 11/1892 Ricker ............... B65D 47/0866
222/517
2,197,352 A * 4/1940 Terkel ..................... F16K 24/02
222/542
(Continued)

FOREIGN PATENT DOCUMENTS

CN 202086156 U 12/2011
CN 103449014 A 12/2013
(Continued)

OTHER PUBLICATIONS

Chinese Office Action and Search Report for Chinese Application No. 201880064840.0, dated Jul. 30, 2021, with an English translation.

(Continued)

*Primary Examiner* — Gideon R Weinerth
(74) *Attorney, Agent, or Firm* — Birch, Stewart, Kolasch & Birch, LLP

(57) ABSTRACT

A lid body that is attachable to a beverage container main body is provided. The lid body includes a lid main body, a first seal portion, a second seal portion, and a plug. The lid main body is detachably fixed to a beverage container main body. The lid main body includes an inner surface and a circumferential edge portion that defines a spout for pouring a beverage. The first seal portion is formed integrally with the inner surface. The second seal portion is formed integrally with the first seal portion and formed using the same material as a material of the first seal portion, and is formed integrally with the circumferential edge portion. The plug is movable between a closing position for sealing the spout and
(Continued)

an opening position for bringing the inside and the outside of the beverage container main body into communication with each other via the spout.

7 Claims, 12 Drawing Sheets

(51) Int. Cl.
*A47J 41/00* (2006.01)
*B65D 39/08* (2006.01)
*B65D 53/02* (2006.01)

(52) U.S. Cl.
CPC ........ *A47J 41/0016* (2013.01); *A47J 41/0027* (2013.01); *B65D 2251/1033* (2013.01); *B65D 2251/1075* (2013.01)

(58) Field of Classification Search
CPC ........ B65D 39/08; B65D 47/06; B65D 47/08; B65D 47/0866; B65D 53/02; B65D 2251/1033; B65D 2251/1075; B65D 43/26; B67D 3/043
USPC ......... 220/200, 795, 780, 254.3, 254.9, 262, 220/259.1; 222/509, 518, 108, 153.14, 222/472, 473, 517, 470, 475.1, 481, 484; 215/244; 141/348, 349, 350, 21
See application file for complete search history.

(56) References Cited

U.S. PATENT DOCUMENTS

| | | | | | |
|---|---|---|---|---|---|
| 3,154,227 | A | * | 10/1964 | Anderson | A47J 36/14 215/396 |
| 3,330,449 | A | * | 7/1967 | Bloomfield | A47J 45/077 222/542 |
| 3,632,025 | A | * | 1/1972 | Bloomfield | A47G 19/12 222/472 |
| 3,655,102 | A | * | 4/1972 | Moran | B65D 47/148 222/546 |
| 3,744,662 | A | * | 7/1973 | Zundel | B65D 17/506 220/834 |
| 4,090,648 | A | * | 5/1978 | Roberts | A47G 19/12 222/570 |
| 4,140,235 | A | * | 2/1979 | Rausing | B65D 39/08 215/305 |
| 4,736,858 | A | * | 4/1988 | Shastal | B65D 47/0876 220/254.3 |
| 4,775,065 | A | * | 10/1988 | Shastal | B65D 47/20 215/250 |
| 4,932,544 | A | * | 6/1990 | Glazer | B67B 7/44 222/475.1 |
| 5,947,343 | A | * | 9/1999 | Horstmann | B65D 47/249 222/472 |
| 5,950,848 | A | * | 9/1999 | Baudin | B65D 47/0814 220/837 |
| 6,269,984 | B1 | * | 8/2001 | Murakami | A47J 31/50 222/472 |
| 6,702,137 | B1 | * | 3/2004 | Kowa | A47J 41/0027 220/254.1 |
| 8,985,406 | B2 | * | 3/2015 | Tachi | A47J 41/0027 222/472 |
| 10,130,214 | B2 | * | 11/2018 | Sachtleben | B65D 43/164 |
| 10,457,450 | B2 | * | 10/2019 | Rios | B65D 47/0804 |
| 2002/0063141 | A1 | * | 5/2002 | Hirose | A47J 41/0027 222/131 |
| 2009/0057349 | A1 | * | 3/2009 | Lin | A47J 41/0027 222/472 |
| 2013/0320011 | A1 | | 12/2013 | Tachi | |
| 2014/0175042 | A1 | | 6/2014 | Lane | |
| 2017/0174400 | A1 | | 6/2017 | Zhang et al. | |
| 2018/0118431 | A1 | | 5/2018 | Hayakawa et al. | |
| 2018/0237190 | A1 | * | 8/2018 | Iwasaki | B65D 47/08 |
| 2019/0127130 | A1 | * | 5/2019 | Ban | B65D 81/3869 |
| 2020/0253399 | A1 | * | 8/2020 | Iwasaki | B65D 53/02 |
| 2020/0290783 | A1 | * | 9/2020 | Iwasaki | B65D 51/242 |

FOREIGN PATENT DOCUMENTS

| | | |
|---|---|---|
| CN | 103569483 A | 2/2014 |
| JP | 60-2637 U | 1/1985 |
| JP | 6-28460 Y2 | 8/1994 |
| JP | 2007-204104 A | 8/2007 |
| JP | 2009-132421 A | 6/2009 |
| JP | 2014-94044 A | 5/2014 |
| JP | 2015-9812 A | 1/2015 |
| JP | 2017-15242 A | 1/2017 |
| WO | WO 2017/110897 A1 | 6/2017 |

OTHER PUBLICATIONS

Japanese Notice of Submission of Publications for Japanese Application No. 2019-547011, dated Apr. 6, 2021.
Japanese Notice of Submission of Publications for Japanese Application No. 2019-547011, dated Jan. 5, 2021.
Japanese Office Action for Japanese Application No. 2019-547011, dated May 18, 2021, with English translation.
International Search Report (PCT/ISA/210) issued in PCT/JP2018/037189, dated Nov. 27, 2018.
Written Opinion of the International Searching Authority (PCT/ISA/237) issued in PCT/JP2018/037189, dated Nov. 27, 2018.
Japanese Notice of Reasons for Refusal for Japanese Application No. 2019-547011, dated Nov. 10, 2020, with an English translation.
Chinese Office Action issued in the counterpart Chinese Patent Application No. 201880064840.0, dated April 2, 2622, with an English translation.
Japanese Office Action for Japanese Application No. 2021-146014, dated Jul. 5, 2022, with English translation.

* cited by examiner

COVER, AND BEVERAGE CONTAINER COMPRISING SAME

TECHNICAL FIELD

The present invention relates to a lid body (cover) and a beverage container provided with the same.

BACKGROUND ART

In order to store beverages such as tea and water, beverage containers called water pitchers, cold water bottles, or the like are used. In order to effectively use a storage space, some such beverage containers can be placed not only in a vertical orientation with a liquid path opening for pouring out a beverage facing upward, but also in a horizontal orientation with the liquid path opening facing sideways. Patent Literature 1 discloses a beverage container that can be stored in a refrigerator in a horizontal orientation, for example. The beverage container includes a lid body that is detachable from a container main body whose upper portion is open.

CITATION LIST

Patent Literature

Patent Literature 1: JP 2009-132421A

SUMMARY OF INVENTION

Technical Problem

The lid body is attached along with an O-ring to the beverage container disclosed in Patent Literature 1 to seal an upper opening of the container main body, and has a swingable pouring lid that is configured to open and close a liquid path opening. The pouring lid is provided with a plug to which a mechanical packing is attached, and is capable of sealing the liquid path opening. Also, the beverage container can be placed horizontally due to a locking means for locking the pouring lid at a closing position being provided. However, if the number of components such as an O-ring and a mechanical packing provided in the beverage container increases, there is an increased risk that these components will be lost, and a cleaning operation and an assembling operation are likely to be troublesome. Note that this issue is not unique to beverage containers that can be placed horizontally and arises in most beverage containers that require seal portions such as an O-ring and a mechanical packing.

The present invention aims to provide a lid body for a beverage container that can be handled easily and is particularly suitable for a beverage container that can be placed horizontally.

Solution to Problem

A lid body according to a first aspect of the present invention is a lid body that is to be attached to a beverage container main body having a circumferential edge portion that defines an opening to close the opening, and the lid body includes a lid main body, a first seal portion, a second seal portion, and a plug. The lid main body is detachably fixed to the circumferential edge portion of the opening to cover the opening. The lid main body includes an inner surface that faces an inner portion of the beverage container main body, and a circumferential edge portion that defines a spout for pouring a beverage contained in the beverage container main body. The first seal portion is formed integrally with the inner surface, and is configured to seal a gap located between the circumferential edge portion of the opening and the lid main body by being in tight contact with the circumferential edge portion of the opening. The second seal portion is formed integrally with the first seal portion and formed using a material that is the same as a material of the first seal portion, and is formed integrally with the circumferential edge portion that defines the spout. The plug is disposed to be movable between a closing position for sealing the spout by being in tight contact with the second seal portion and an opening position for bringing the inside and the outside of the beverage container main body into communication with each other via the spout.

A lid body according to a second aspect of the present invention is the lid body according to the first aspect, and the first seal portion and the second seal portion are formed using a material that is different from a material of the lid main body.

A lid body according to a third aspect of the present invention is the lid body according to the first aspect or the second aspect, and the lid main body and the plug are made of a resin, and the first seal portion and the second seal portion are made of an elastomer. Thus, the lid main body can be configured to be light-weight and be of a hardness at which the lid main body is unlikely to deform, and workability for attaching and detaching the lid main body to/from the container main body and opening and closing the spout can be ensured. At the same time, due to the elastomer having elasticity, the first seal portion can be in tight contact with the circumferential edge portion of the opening of the beverage container main body, and the second seal portion can be in tight contact with the plug, and thus sealability can be ensured.

A beverage container according to a fourth aspect of the present invention includes a beverage container main body having a circumferential edge portion that defines an opening and the lid body according to any of the first to third aspects that is attached to the beverage container main body.

Advantageous Effects of Invention

According to the above-described aspects, the first seal portion serves as a mechanical packing for sealing a gap located between the lid main body and the circumferential edge portion of the opening of the beverage container main body, and the second seal portion serves as a mechanical packing for sealing a gap located between the spout and the plug. Also, the first seal portion and the second seal portion are formed as a single body using the same material. Also, the first seal portion is formed integrally with the inner surface of the lid body, and the second seal portion is formed integrally with the circumferential edge portion of the spout. Thus, the number of components does not increase, there is no risk of losing a mechanical packing, and the beverage container can be handled easily at the time of a cleaning operation and an assembling operation, for example. Also, there is no gap that water, dirt, or the like can enter, between the first seal portion and the inner surface of the lid body, and between the second seal portion and the circumferential edge portion of the spout, and thus cleaning can be easily performed.

DESCRIPTION OF EMBODIMENTS

Hereinafter, a lid body according to one embodiment of the present invention and a beverage container provided with the lid body will be described with reference to the drawings.

1. Overview of Beverage Container

Figure 1:
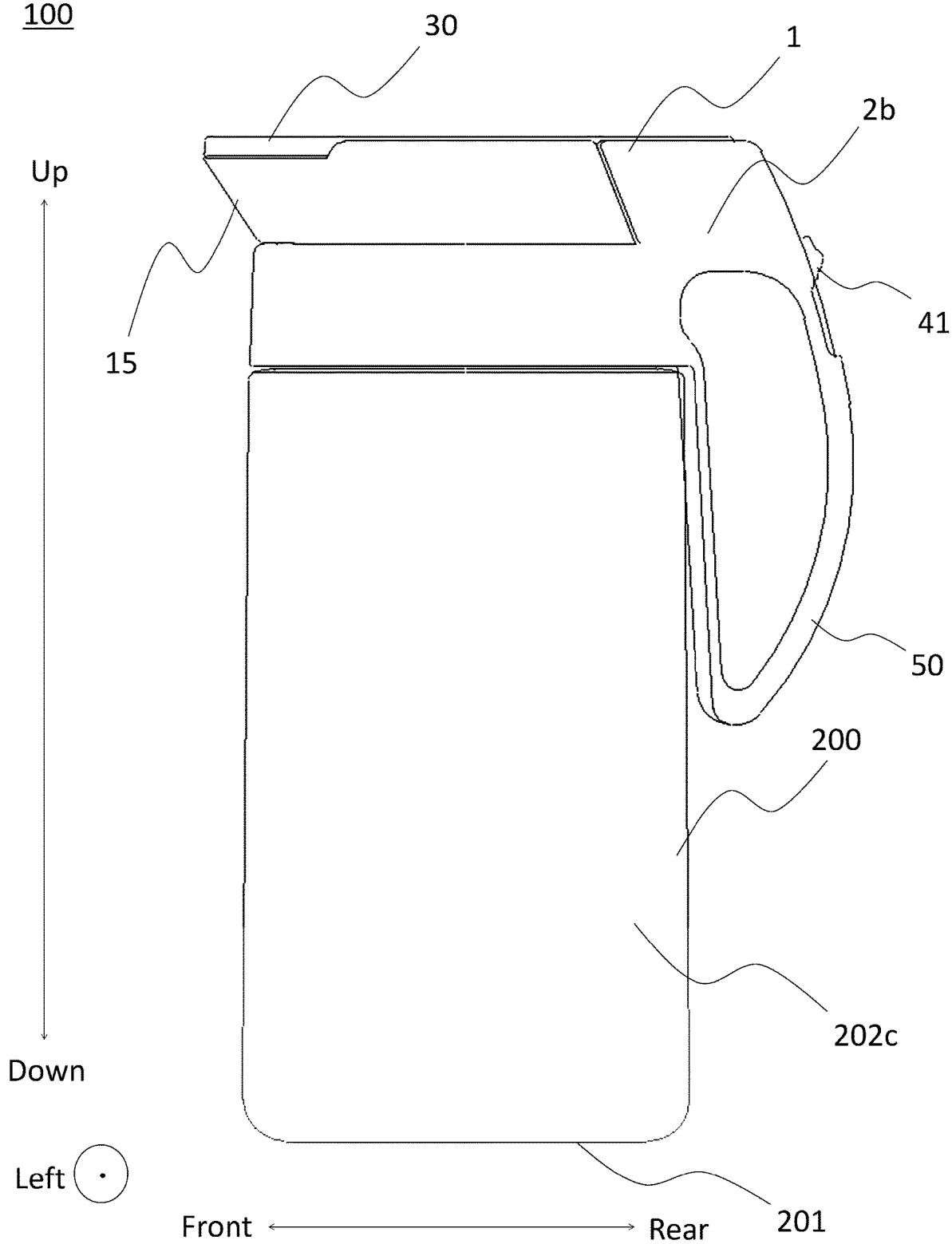
FIG. 1 is an external side view of a beverage container according to one embodiment of the present invention.
Figure 2:
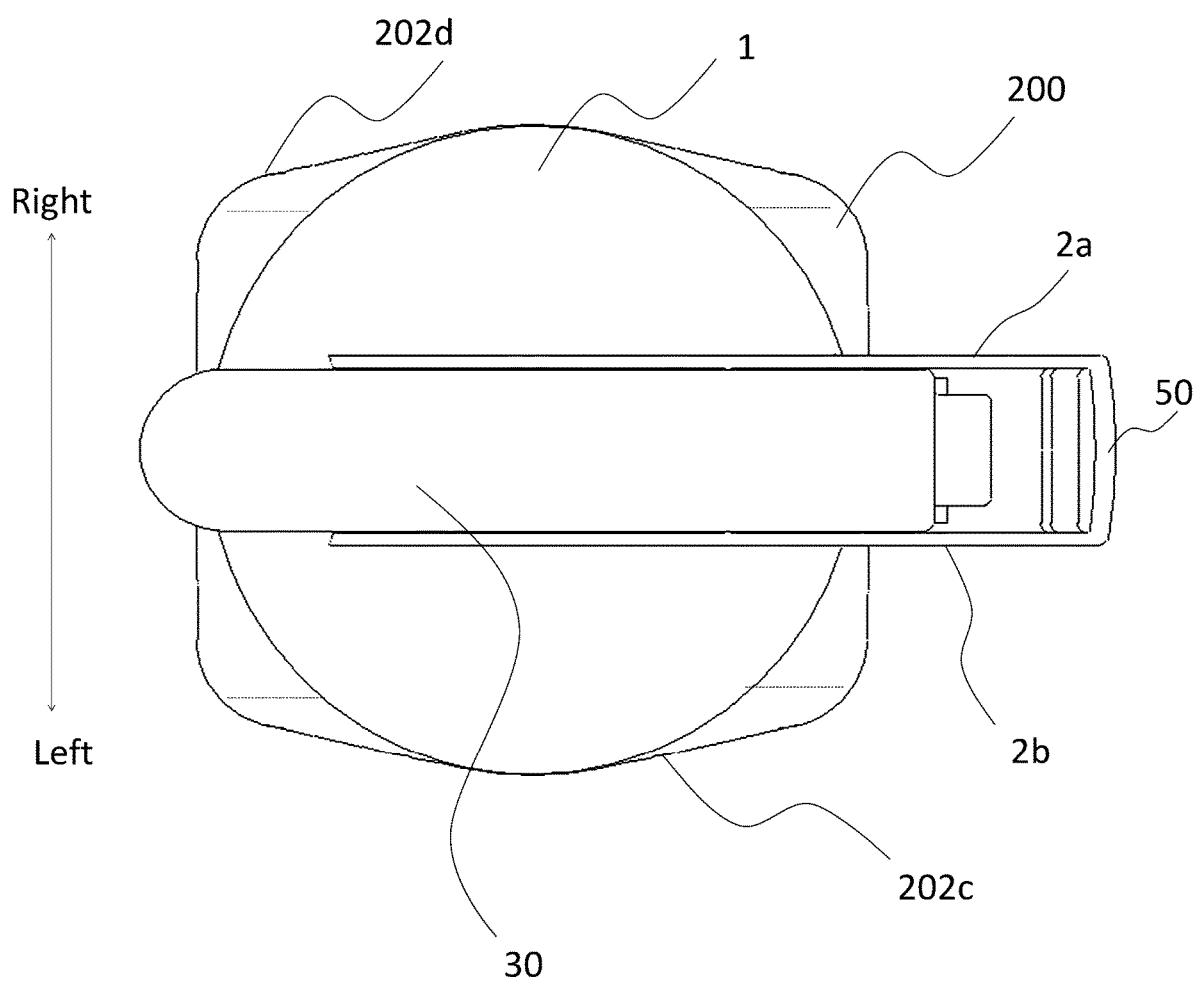
FIG. 2 is an external plan view of the beverage container.

FIG. 1 is an external side view of a beverage container 100 according to this embodiment, and FIG. 2 is an external plan view thereof. The beverage container 100 is a beverage container called a water pitcher, a cold water bottle, or the like, and is used to store beverages such as tea and water. Also, the beverage container 100 can be stored in an empty space in a refrigerator in various orientations such as a vertical orientation and a horizontal orientation, thus effectively utilizing the limited space of the refrigerator. The "vertical orientation" refers to an orientation in which a bottom surface portion 201 is located vertically downward and a spout portion 15 is located vertically upward, and the "horizontal orientation" refers to an orientation in which a side surface portion 202c or 202d is located vertically downward and the spout portion 15 faces sideways.

The beverage container 100 according to this embodiment includes a container main body 200 and a lid body 1. The container main body 200 is a container with an upper opening. The lid body 1 is detachably attached to the container main body 200 to seal the opening of the container main body 100. Note that the up-down direction and the front-rear direction are defined as in FIG. 1 in the following description. Also, it is assumed that a direction extending from the back of the paper toward the front is left, and a direction extending from the front toward the back is right. Hereinafter, the other drawings will be described based on this definition.

Figure 3A:
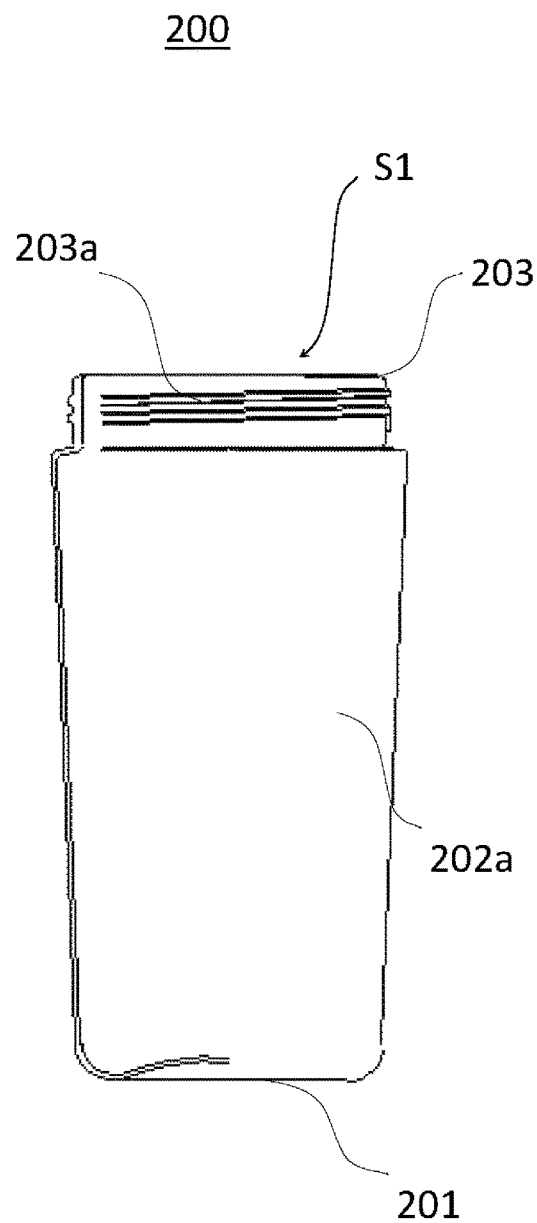
FIG. 3A is a front view of a beverage container main body.
Figure 3B:
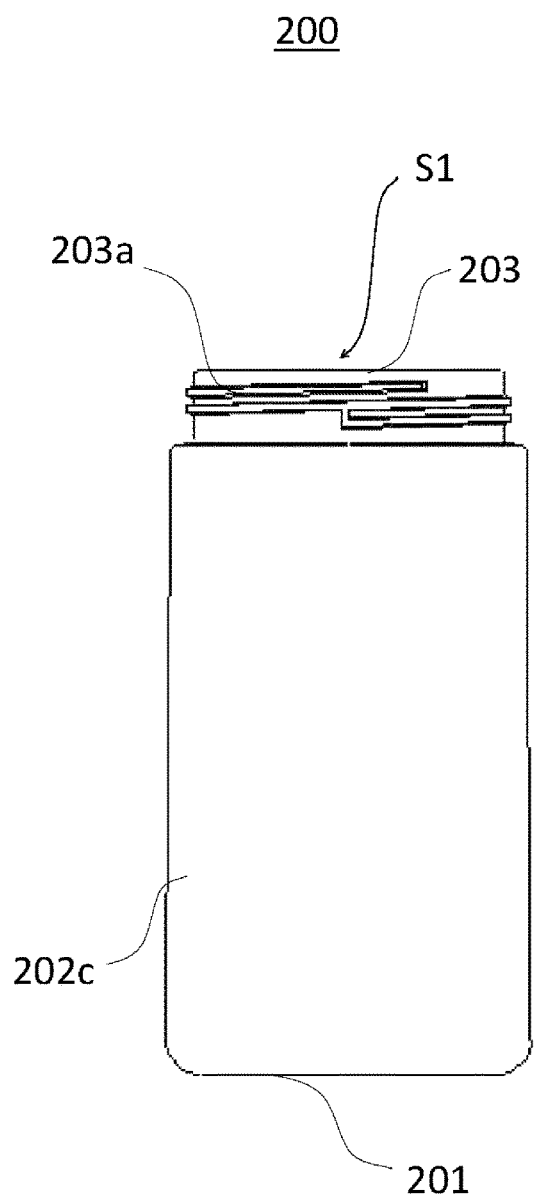
FIG. 3B is a side view of the beverage container main body.

As shown in FIGS. 3A and 3B, the container main body 200 is a container whose upper portion is open such that a beverage can be contained therein, and the container main body 200 includes the bottom surface portion 201 and a tubular side surface portion 202 surrounding the bottom surface portion 201. FIG. 3A is a diagram of the container main body 200 when viewed from the front direction, and FIG. 3B is a diagram of the container main body 200 when viewed from the left direction. Note that, although there is no particular limitation on materials of the portions of the container main body 200, these portions may be made of a hard resin, for example. Also, the container main body 200 is desirably formed to be transparent such that the inner portion thereof can be visually recognized.

As shown in FIG. 2, the bottom surface portion 201 has a substantially rectangular shape. As shown in FIG. 3, the side surface portion 202 includes side surface portions 202a and 202b extending upward and straight from front and rear short sides of the bottom surface portion 201, and side surface portions 202c and 202d extending upward from left and right long sides thereof with a slight inclination. That is, the side surface portions 202a to 202d are formed into a substantially planar shape. Thus, the container main body 200 can stably stand in a state in which the bottom surface portion 201 is located vertically downward, and is also stabilized even in a state in which the left and right side surface portions 202c and 202d are located vertically downward.

A cylindrical portion 203 provided with a screw groove 203a on an outer circumferential surface thereof is continuous with an upper portion of the side surface portion 202. The cylindrical portion 203 is a circumferential edge portion defining an upper opening S1 of the container main body 200. Hereinafter, the cylindrical portion 203 may be referred to as a "circumferential edge portion 203". A beverage to be stored in the beverage container 100 is poured through the upper opening S1, and is contained in the container main body 200. The screw groove 203a is screwed to a screw groove 12a of the lid body 1, which will be described later, and enables attachment and detachment of the lid body 1 to/from the container main body 200.

2. Configuration of Lid Body 2-1. Overall Configuration

Figure 4:
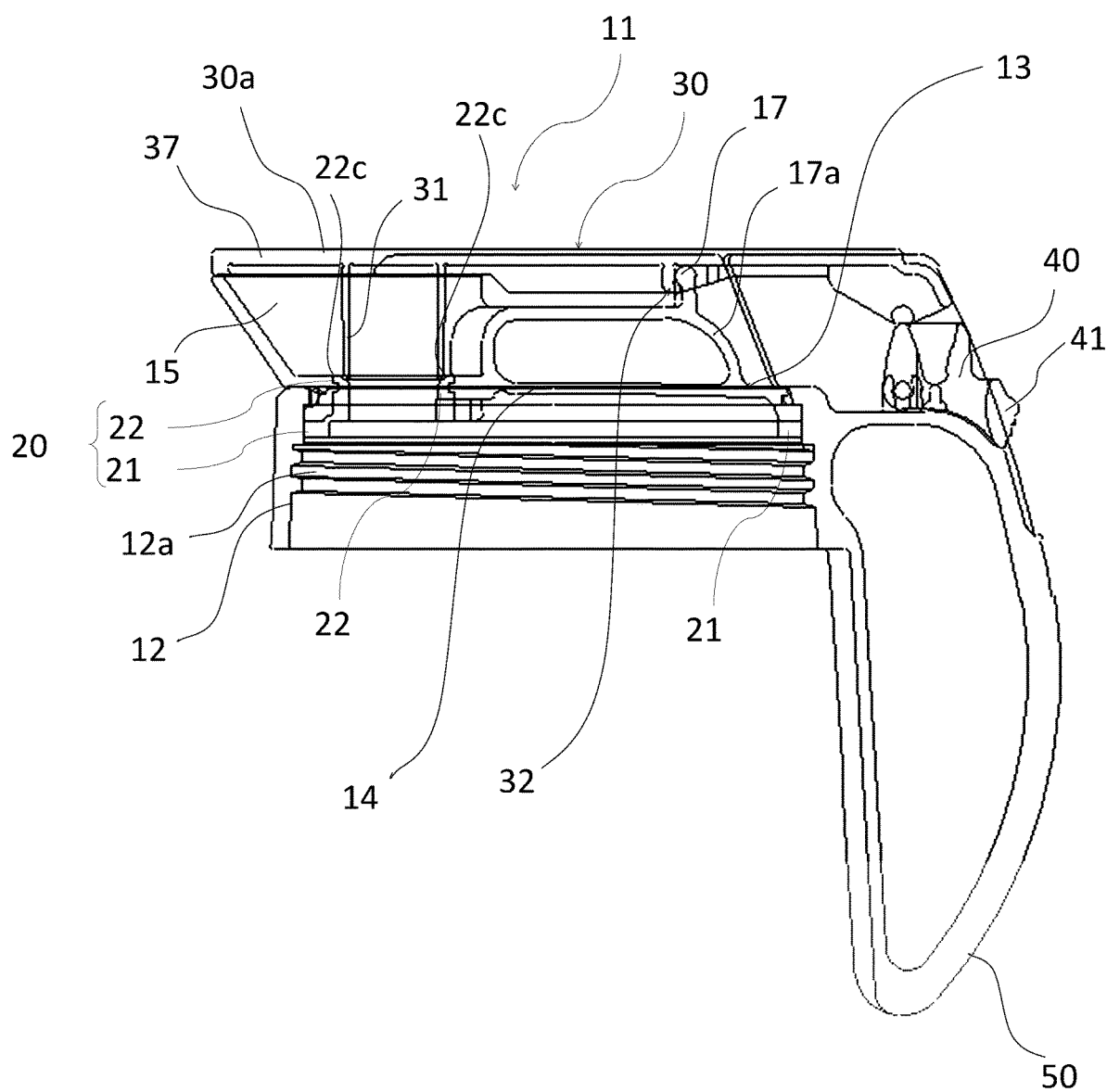
FIG. 4 is a see-through side view of an inner portion of a lid body.

FIG. 4 is a side view of the lid body 1. The lid body 1 is configured to cover the upper opening S1 of the container main body 200, and includes a lid main body 11 and a later-described seal portion 20 made of an elastomer. The lid main body 11 of this embodiment is made of a hard resin such as polypropylene or an ABS resin. The lid main body 11 includes a cylindrical portion 12 that has the screw groove 12a on an inner circumferential surface thereof and a circular plate-shaped upper surface portion 13 that is continuous with an upper edge of the cylindrical portion 12. Thus, as a result of rotating the lid body 1 while moving the screw groove 12a along the screw groove 203a, the lid body 1 can be attached to the container main body 200. Also, a lower surface 14 of the upper surface portion 13 faces the inner portion of the container main body 200 via the upper opening S1. Hereinafter, the lower surface 14 is referred to as an "inner surface 14".

Figure 5:
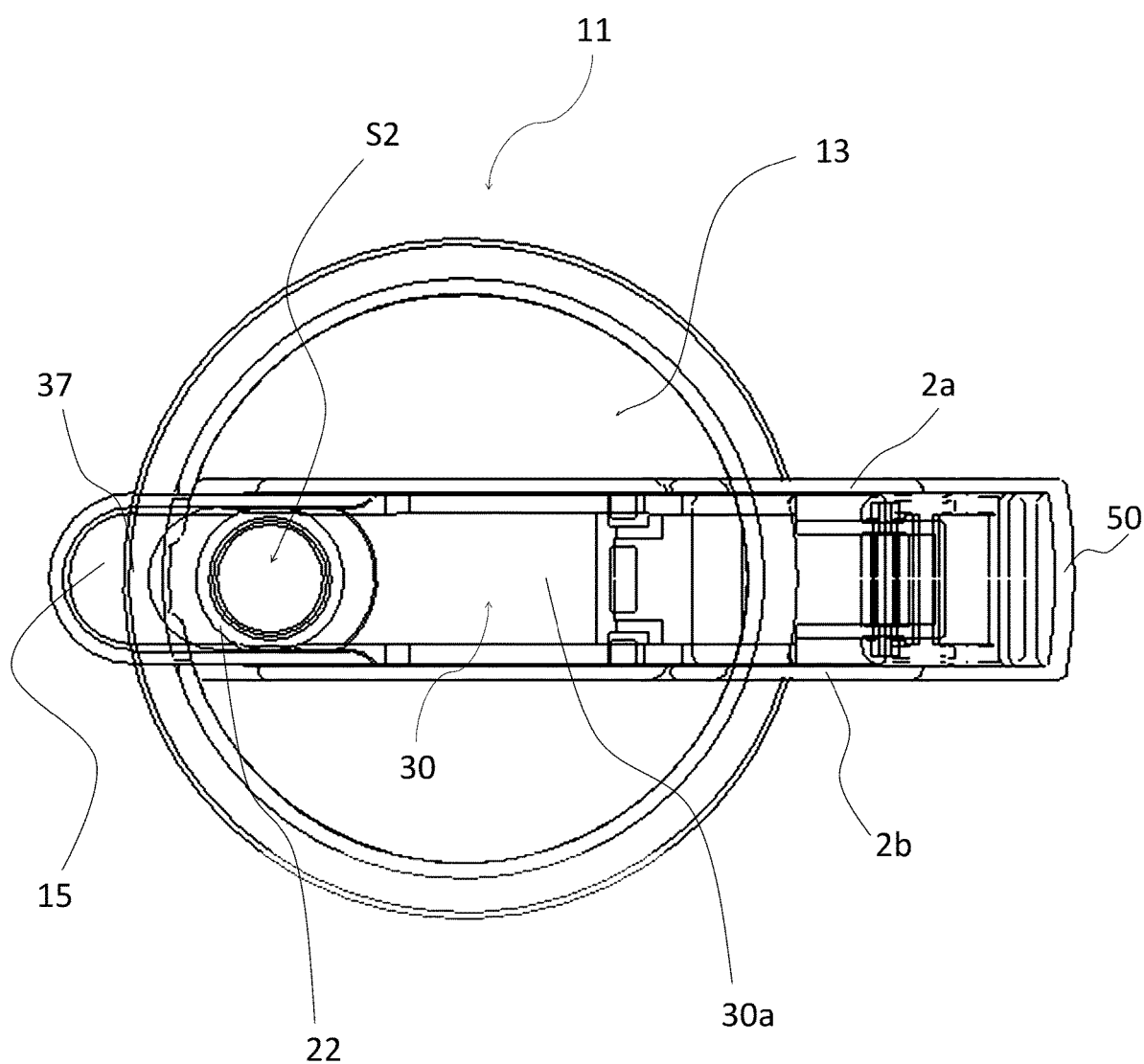
FIG. 5 is a see-through plan view of the inner portion of the lid body.

FIG. 5 is a see-through plan view of the inner portion of the lid body 1. As shown in FIG. 5, the substantially circular plate-shaped upper surface portion 13 is provided with a circular opening S2 at a position away from the center thereof frontward in the radial direction. This opening S2 is an opening for bringing the inside and the outside of the container main body 200 into communication with each other in a state in which the lid body 1 is attached to the container main body 200, and serves as a spout for pouring a beverage contained in the container main body 200 into a cup or the like. The opening S2 is defined by a circumferential edge portion 60 that is formed as a single body with a second seal portion 22, which will be described later. Also, an upper surface 22c of the second seal portion 22 constitutes a valve seat 22c, which will be described later.

As shown in FIGS. 2 and 5, the lid main body 11 includes a pair of plate-shaped left and right wall portions 2a and 2b that extend upward from the upper surface portion 13 and extend in the front-rear direction. The wall portions 2a and 2b have a structure in which the wall portions 2a and 2b are bilaterally symmetrical with respect to a plane that passes through the center of the upper surface portion 13 and extends in the front-rear direction and the up-down direction. The above-described opening S2 is disposed between the wall portions 2a and 2b.

A seesaw member 30 and a locking member 40, which will be described later, are housed in the space between the wall portions 2a and 2b. The locking member 40 is an operation portion on which a user performs an operation in order to swing the seesaw member 30. Thus, when the locking member 40 is operated and the seesaw member 30 is swung, a valve body 31 (a plug) connected to a region near a front end portion 37 of the seesaw member 30 swings to open and close the opening S2. The lid main body 11, the seal portion 20, the seesaw member 30, the locking member 40, and the valve body 31 constitute a portion of the lid body 1.

As shown in FIG. 5, the lid main body 11 includes, in the vicinity of the opening S2, a beverage spout portion 15 that is continuous with front portions of the wall portions 2a and 2b. As shown in FIG. 4, the spout portion 15 forms a funnel-shaped sloped surface that is inclined to spread upward from the upper surface portion 13, and the space defined by the sloped surface is in communication with the opening S2. Thus, the beverage container 100 is formed such that, when the beverage container 100 is tilted, a beverage flows along the sloped surface of the spout portion 15 from the container main body 200 into a cup or the like. The front end portion 37 of the seesaw member 30 covers the entire spout portion 15 when the opening S2 is sealed, and opens the spout portion 15 when the opening S2 is open. Thus, it is possible to prevent dust and the like from entering the spout portion 15 and making it dirty.

Also, as shown in FIG. 1, the lid main body 11 includes a gripping portion 50. As shown in FIGS. 2 and 5, the gripping portion 50 extends downward from a rear portion of the wall portions 2a and 2b that is located opposite the spout portion 15. As shown in FIG. 1 and the like, the gripping portion 50 is an annular member having a through hole extending in the right-left direction, and the user can grip the gripping portion 50 with a hand. The user can utilize this gripping portion 50 at times such as when pouring a beverage from the spout portion 15, and when carrying the beverage container 100.

2-2. Configuration of Seal Portion

The following describes a configuration of the seal portion 20 formed in the lid body 1. As described above, the seal portion 20 is made of an elastomer, and serves as a mechanical packing for maintaining the liquid tightness of the beverage container 100 through elastic deformation. The seal portion 20 seals a gap between the container main body 200 and the lid main body 11 by being in tight contact with the circumferential edge portion 203 of the upper opening S1 in a state in which the lid body 1 is attached to the container main body 200. Also, the seal portion 20 seals the opening S2, which is a beverage spout, by being in tight contact with the valve body 31, which will be described later. Note that the former sealability is achieved by a first seal portion 21 included in the seal portion 20, and the latter sealability is achieved by a second seal portion 22 included in the seal portion 20. The first seal portion 21 and the second seal portion 22, that is, the seal portion 20 overall, are made as a single body from the same material.

Figure 6:
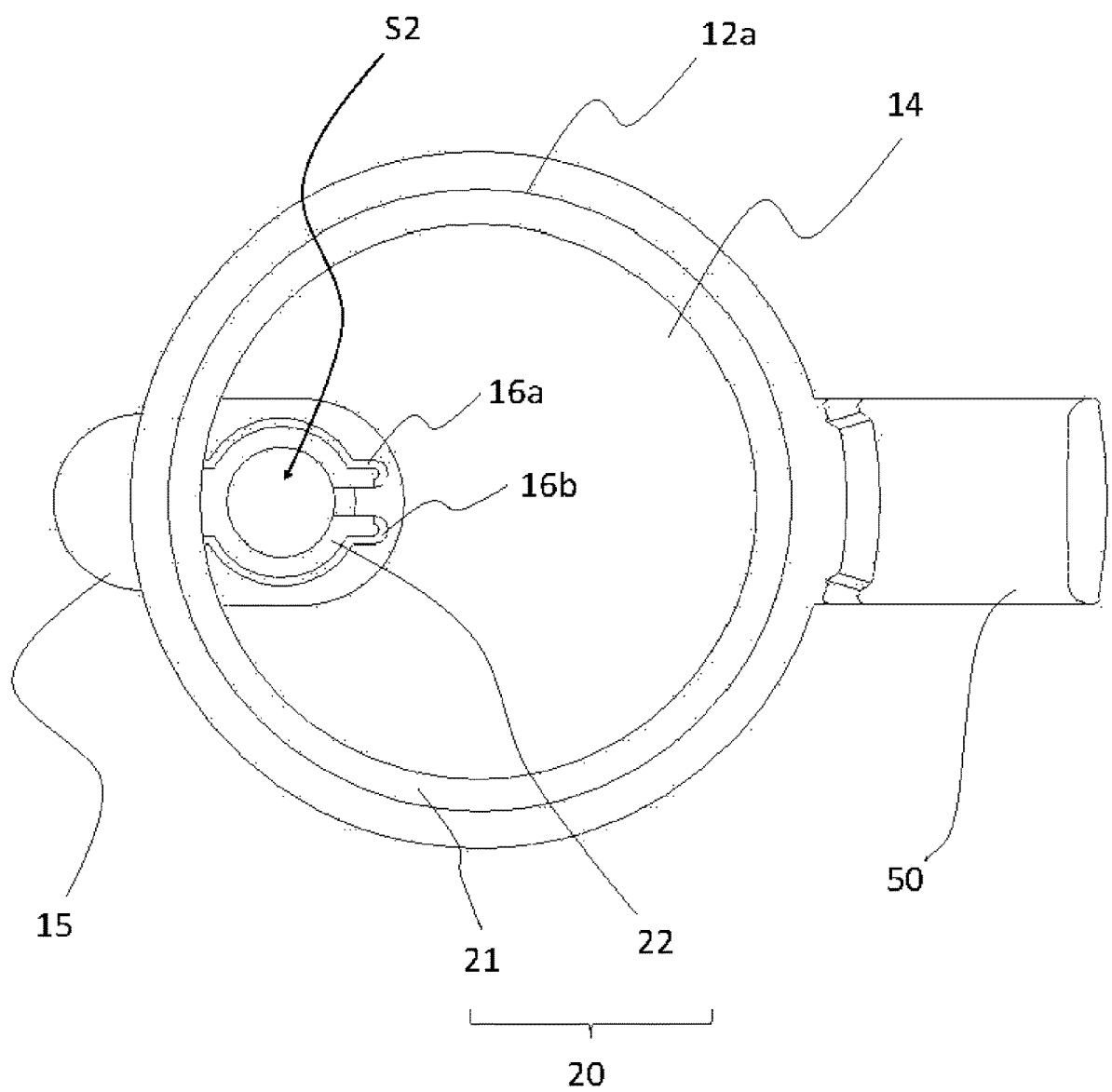
FIG. 6 is a bottom view of the lid body.
Figure 8:
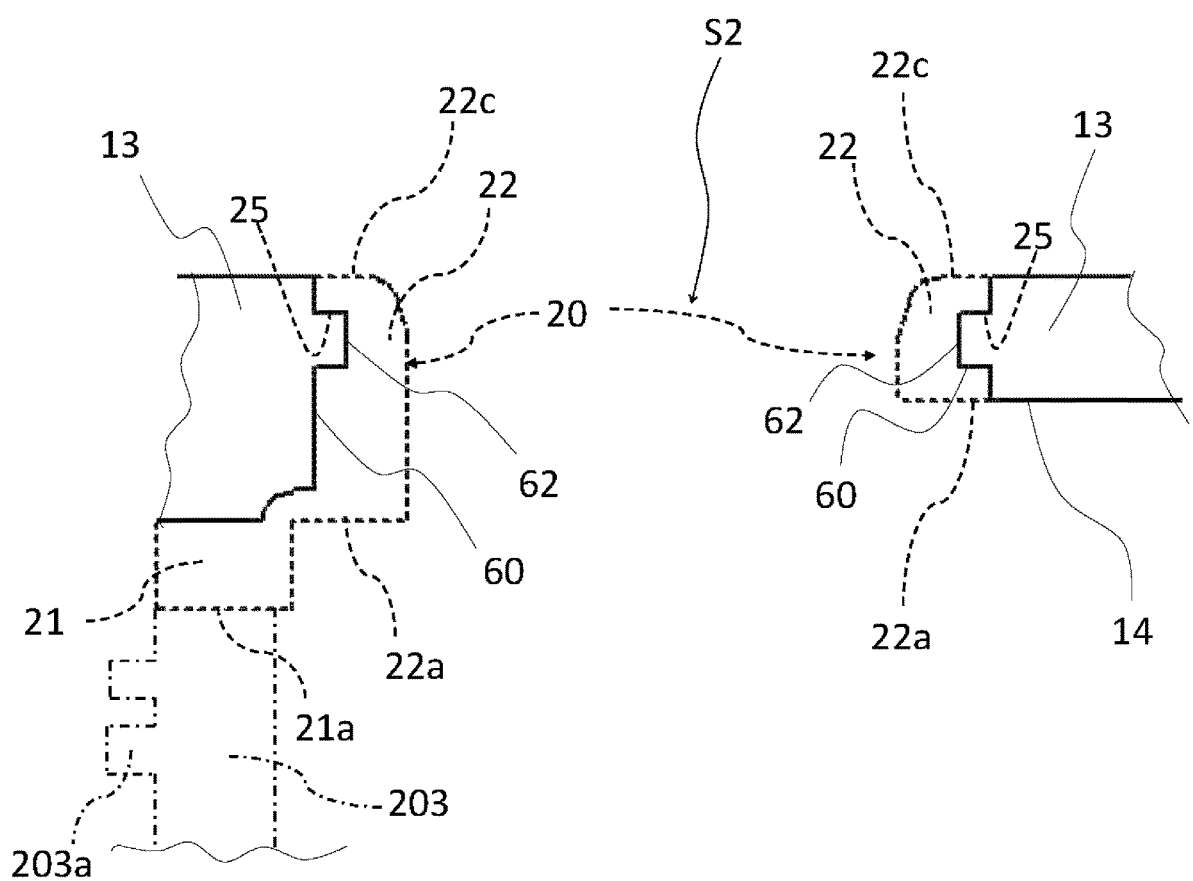
FIG. 8 is an enlarged cross-sectional view near an opening, which is a spout.

FIG. 6 is a bottom view of the lid body 1, showing the lid body 1 when viewed from the inner surface 14 side. As shown in FIG. 6, the inner surface 14 is provided with two bilaterally symmetric walls 16a and 16b. The walls 16a and 16b each have a shape extending from the vicinity of the spout portion 15 inward in the radial direction, further extending around the opening S2 in a semicircular shape toward the gripping portion 50, and turning back at the end thereof. The walls 16a and 16b extend straight from the inner surface 14 toward the container main body 200 located on the lower side thereof. The second seal portion 22 has a substantially cylindrical shape, and is formed with, as a single body, the walls 16a and 16b, and the circumferential edge portion 60 (see FIG. 8) of the opening S2. As shown in FIG. 8, the second seal portion 22 extends from a portion located on the spout portion 15 side outward in the radial direction and downward along the circumferential edge portion 60, and is continuous with the first seal portion 21. The walls 16a and 16b, and the circumferential edge portion 60 are all portions of the lid main body 11, and as described above, are made of a hard resin, which is a different material to that of the second seal portion 22. However, the second seal portion 22 is constituted as a single body so as to be unattachable or undetachable to/from these portions of the lid main body 11, and no gap is formed therebetween.

As described above, the first seal portion 21 seals the upper opening S1 by being in tight contact with the circumferential edge portion 203 of the upper opening S1 in a state in which the lid body 1 is attached to the container main body 200. Thus, the first seal portion 21 has a substantially ring shape, and has an outer diameter that is substantially equal to that of the circumferential edge portion 203 of the upper opening S1. The first seal portion 21 extends in the circumferential direction in the vicinity of the outer circumferential edge of the inner surface 14, and is formed as a single body with the inner surface 14. The upper surface portion 13 having the inner surface 14 is a portion of the lid main body 11, and as described above, is made of a hard resin, which is a different material to that of the first seal portion 21. However, the first seal portion 21 is constituted as a single body so as to be unattachable or undetachable to/from the upper surface portion 13 of the lid main body 11, and no gap is formed between the first seal portion 21 and the inner surface 14.

As described above, the seal portion 20 is formed as a single body with the lid main body 11 as a portion of the lid body 1. Thus, water, dirt, or the like cannot enter between the seal portion 20 and the lid main body 11, and these portions can be easily cleaned.

Figure 7A:
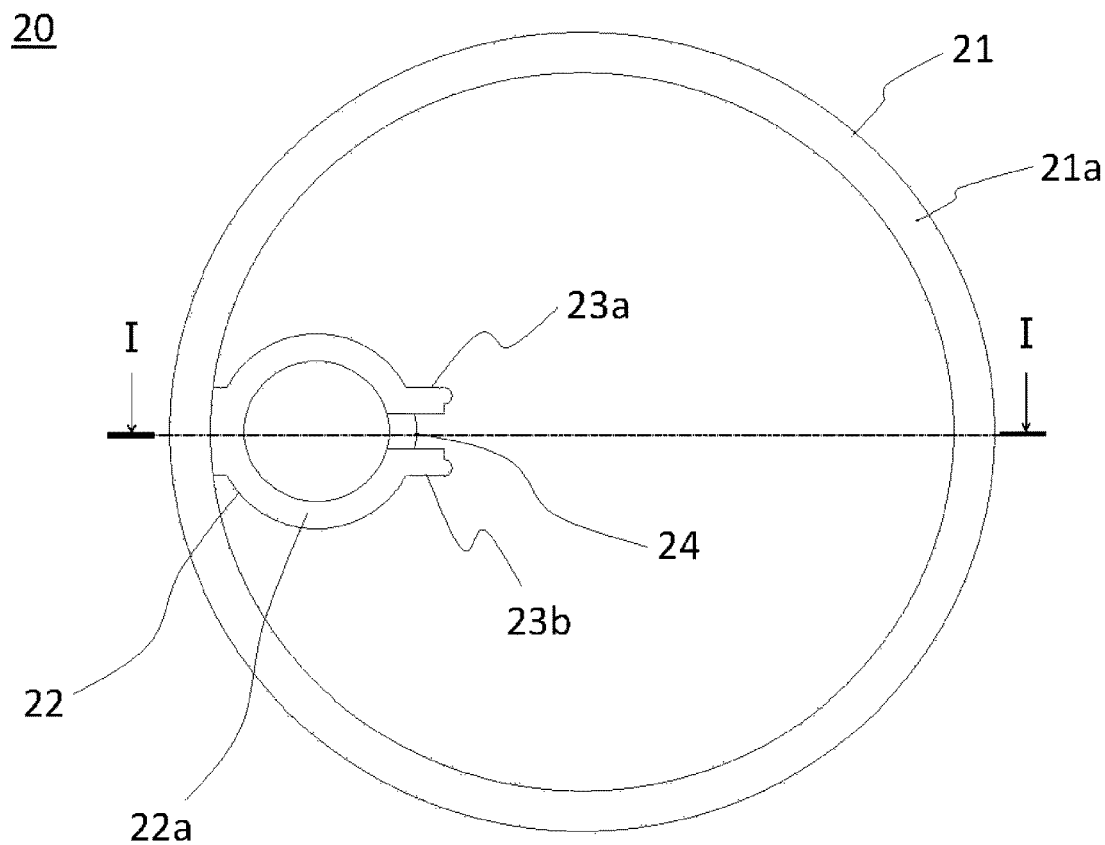
FIG. 7A is a bottom view of a seal portion.
Figure 7B:
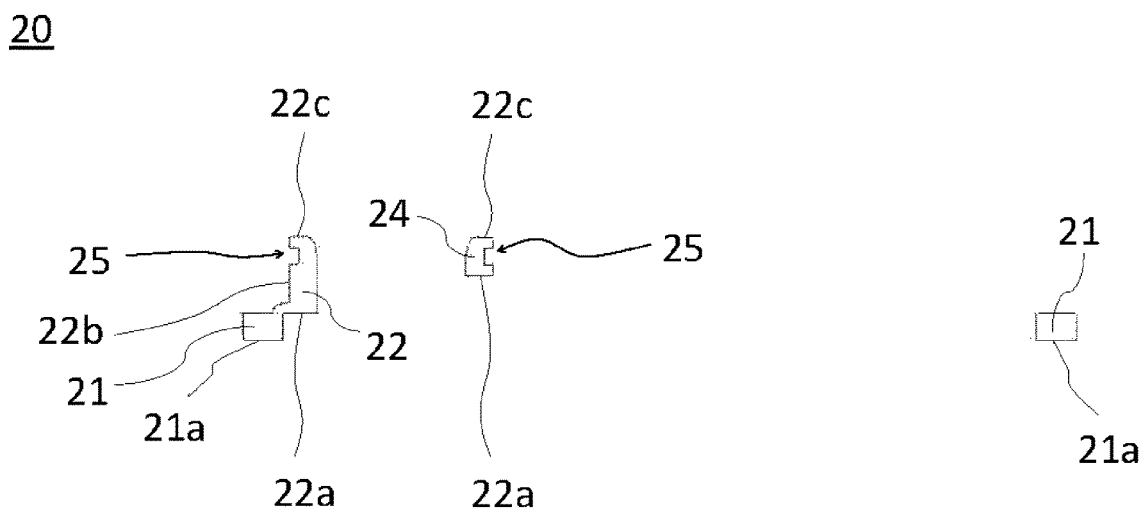
FIG. 7B is a cross-sectional view of the seal portion taken along I-I in FIG. 7A.

FIG. 7A is a bottom view of the seal portion 20, and FIG. 7B is a cross-sectional view of the seal portion 20 taken along I-I in FIG. 7A. As shown in FIG. 7A, the second seal portion 22 is formed to be continuous with an inner circumferential portion of the first seal portion 21 and extend inward in the radial direction. Note that, when the lid body 1 is attached to the container main body 200, a surface facing the inner portion of the container main body 200 is referred to as a lower surface of the seal portion 20, and the lower surface of the first seal portion 21 is denoted by 21a, and the lower surface of the second seal portion 22 is denoted by 22a. As shown in FIG. 7B, the positions of the lower surface 21a and the lower surface 22a in the up-down direction do not coincide with each other, and the lower surface 22a is located at a position that is higher than that of the lower surface 21a in the up-down direction. Two arm portions 23a and 23b extend in shapes corresponding to the shapes of the above-described walls 16a and 16b at positions of the second seal portion 22 located approximately 180 degrees away from a portion continuous with the first seal portion 21. A notch portion 24 is formed in the up-down direction between the arm portion 23a and the arm portion 23b, and the lower surface 22a located at the notch portion 24 is located at a position that is higher than that of the lower surface 22a in the up-down direction at the other portion. In other words, the thickness of the second seal portion 22 is smaller than that of the other portion at the notch portion 24. On the other hand, as shown in FIG. 7B, the first seal portion 21 has a substantially constant thickness over the entire circumferential direction thereof.

As shown in FIG. 7B, the second seal portion 22 has a substantially cylindrical shape, and a recess 25 is formed in an outer circumferential surface 22b thereof, and the second seal portion 22 has an upper surface 22c that is located opposite to the lower surface 22a. The upper surface 22c serves as a valve seat of the valve body 31, which will be described later. Hereinafter, the upper surface 22c may also be referred to as the "valve seat 22c". The recess 25 is formed over the entire circumferential direction thereof. The second seal portion 22 has a substantially constant thickness over the circumferential direction thereof, except for the notch portion 24. The lower surface 22a of the second seal portion 22 is formed to extend from the vicinity of the upper surface of the first seal portion 21 inward in the radial direction.

FIG. 8 shows details of a cross-section near the opening S2 forming the spout of the lid main body 11. The lid main body 11 is indicated by a solid line, and the seal portion 20 is indicated by a broken line. Also, the cylindrical portion 203 of the container main body 200 is indicated by a dash-dot line for reference. The second seal portion 22 is formed to be in tight contact with the circumferential edge portion 60 while a protrusion 62 of the circumferential edge portion 60 is received by the recess 25. Note that, although a beverage spout is formed by the opening S2 defined by the circumferential edge portion 60, the second seal portion 22 extends along the inner circumferential surface of the circumferential edge portion 60, and thus the spout through which liquid actually passes is a space that is slightly smaller than the opening S2. From this point of view, it can be said that the opening S (the spout) is defined by the second seal portion 22.

As shown in FIG. 8, the upper surface of the upper surface portion 13 and the valve seat 22c of the second seal portion 22 are formed to be flush with each other. On the other hand, the inner surface 14 of the lid main body 11 is formed to be flush with the lower surface 22a of the notch portion 24 of the second seal portion 22. Also, the lower surface 22a excluding the notch portion 24 is formed to be flush with the lower ends of the walls 16a and 16b.

If the screw groove 12a of the lid body 1 is moved along the screw groove 203a of the container main body 200 while the lid body 1 is rotated, as shown in FIG. 8, the lower surface 21a of the first seal portion 21 comes into contact with the upper end of the cylindrical portion 203 of the container main body 200. When a screw structure constituted by the screw groove 12a and the screw groove 203a is closed off, the upper end of the cylindrical portion 203 slightly protrudes into the lower surface 21a of the first seal portion 21. That is, the lower surface 21a of the first seal portion 21 is in tight contact with the upper end of the cylindrical portion 203, thus keeping the upper opening S1 of the container main body 200 liquid-tight. On the other hand, when the opening S2, which is a beverage spout, is closed, as shown in FIG. 4, the upper surface 22c of the second seal portion 22 comes into contact with the lower end of the cylindrical valve body 31 that will be described later, thus keeping the opening S2 liquid-tight. That is, according to the above-described configuration, the seal portion 20 formed in the lid body 1 can serve as a mechanical packing for sealing not only the upper opening S1 of the container main body 200 but also the opening S2 formed in the lid body 1.

2-3. Configuration of Locking Mechanism

Next, a locking mechanism capable of opening and closing the opening S2 that is a spout, and locking the closed state and the open state of the opening S2 will be described. The swingable seesaw member 30 constituting a portion of the lid body 1 opens and closes the opening S2. As shown in FIG. 5, the seesaw member 30 is disposed to be held in the right-left direction between the wall portions 2a and 2b. Similarly to the lid main body 11, the seesaw member 30 of this embodiment is made of a hard resin such as polypropylene or an ABS resin.

As shown in FIGS. 4 and 5, the seesaw member 30 has a substantially plate-shaped main body portion 30a that extends in the front-rear direction, covering the spout portion 15 from a leading end thereof to an upper portion of the gripping portion 50. The cylindrical valve body 31 is attached to the vicinity of the front end portion 37 of the main body portion 30a. The valve body 31 is disposed such that the center axis thereof extends in the up-down direction on the lower surface of the main body portion 30a. In this embodiment, the valve body 31 is formed as a single body with the main body portion 30a. The valve body 31 opens and closes the opening S2 following swinging of the seesaw member 30. In the state shown in FIGS. 4 and 5, the main body portion 30a is located substantially horizontally, and the lower end of the valve body 31 seals the opening S2 by being in tight contact with the upper surface 22c of the second seal portion 22. Here, a state in which the opening S2 is sealed by the valve body 31 is referred to as a "closed state", and a state in which the opening S2 is open is referred to as an "open state".

Figure 9A:
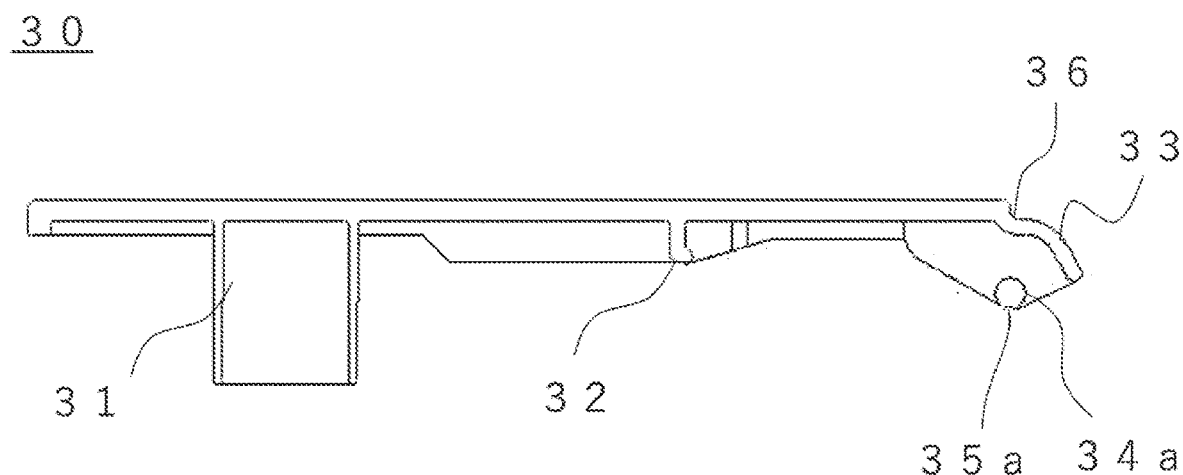
FIG. 9A is a see-through side view of an inner portion of a seesaw member.
Figure 9B:
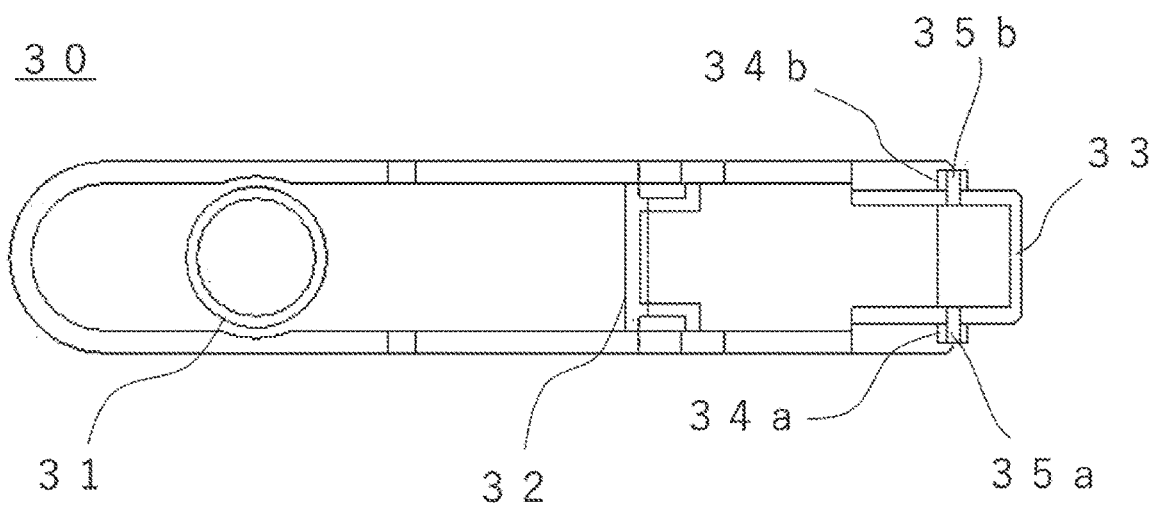
FIG. 9B is a bottom view of the seesaw member.

FIG. 9A is a see-through side view of an inner portion of the seesaw member 30, and FIG. 9B is a bottom view of the seesaw member 30. As shown in FIG. 9. the seesaw member 30 includes, at the rear end portion 33 of the main body portion 30a, a pair of left and right columnar bodies 34a and 34b extending in the right-left direction. The center axes of the columnar bodies 34a and 34b coincide with each other. The right columnar body 34a has a shape in which a portion of the round column is cut out therefrom when viewed from the right-left direction, and the cut-out portion forms a recess 35a that is recessed in an arc shape. Note that the seesaw member 30 has a bilaterally symmetrical shape overall. Thus, the left columnar body 34b also has a shape that is bilaterally symmetrical to the right columnar body 34a, and similarly, has a recess 35b. The recesses 35a and 35b are configured to respectively receive leading ends of protrusions 43a and 43b of the locking member 40, which will be described later (see FIG. 12A). The upper surface of the rear end portion 33 of the main body portion 30a is provided with a pressed portion 36 that is curved in a curve shape with the columnar bodies 34a and 34b being at a substantial center in a side view.

As shown in FIG. 9, the seesaw member 30 has, as a swing fulcrum portion, a hook-shaped claw portion 32 extending downward from the main body portion 30a near the center in the front-rear direction. The claw portion 32 is configured to engage with a spherical claw portion 17 (see FIG. 4) extending upward from a base portion 17*a* that extends upward from the upper surface portion 13 between the wall portions 2*a* and 2*b*. The claw portion 32 can slide along the surface of the claw portion 17 about the claw portion 17. The seesaw member 30 can swing as the claw portion 32 slides along the surface of the claw portion 17, with a point at which the claw portion 32 engages with the claw portion 17 acting as a fulcrum.

The rear end portion 33 of the seesaw member 30 is supported by the locking member 40. The locking member 40 is a member operated by a user in order to swing the seesaw member 30. As shown in FIG. 1, the locking member 40 is configured such that, in the appearance of the beverage container 100, only a portion of a lever portion 41 included in the locking member 40 protrudes from the rear side of the gripping portion 50 and the wall portions 2*a* and 2*b* located upward of the gripping portion 50. The positional relationship between the lever portion 41 and the gripping portion 50 is a positional relationship that, when the user grips the gripping portion 50, the thumb of the user comfortably abuts against the lever portion 41. Similarly to the lid main body 11, the locking member 40 of this embodiment is made of a hard resin such as polypropylene or an ABS resin.

Figure 10A:
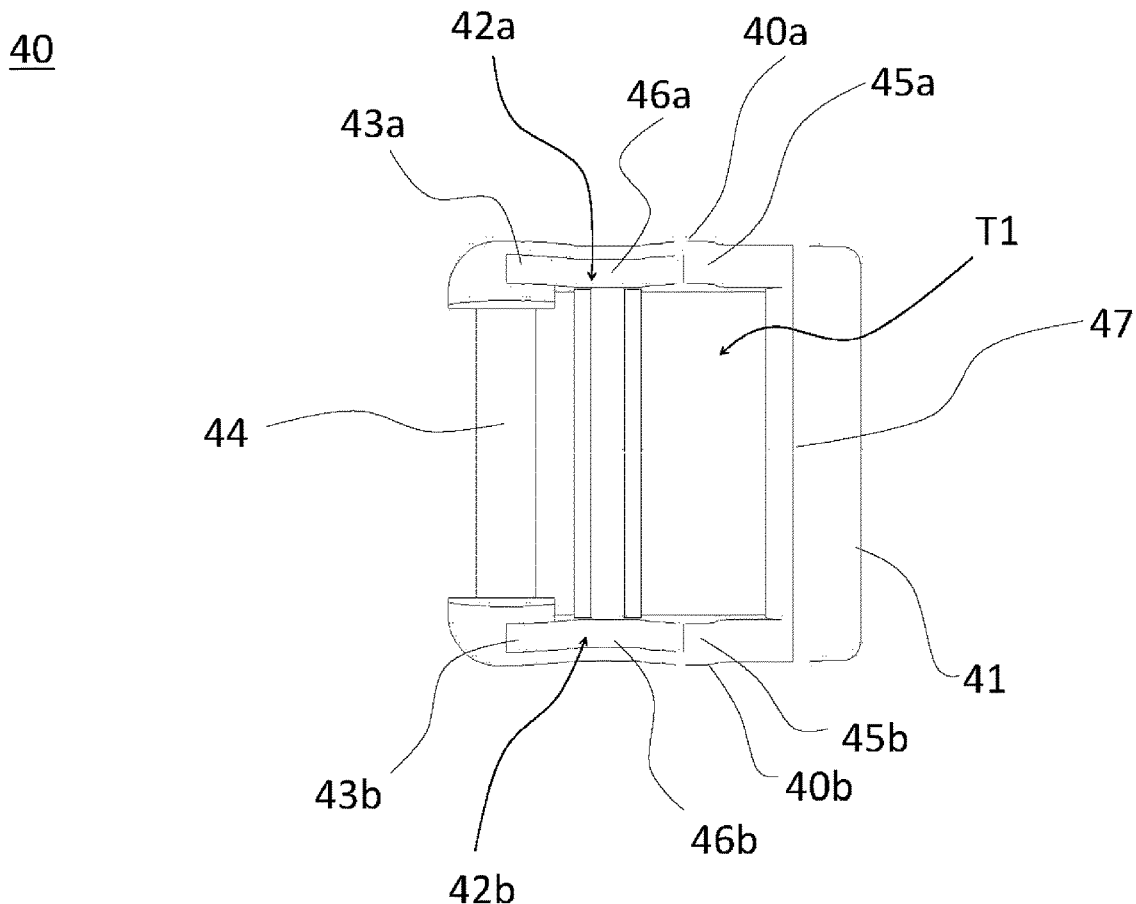
FIG. 10A is a plan view of a locking member.
Figure 10B:
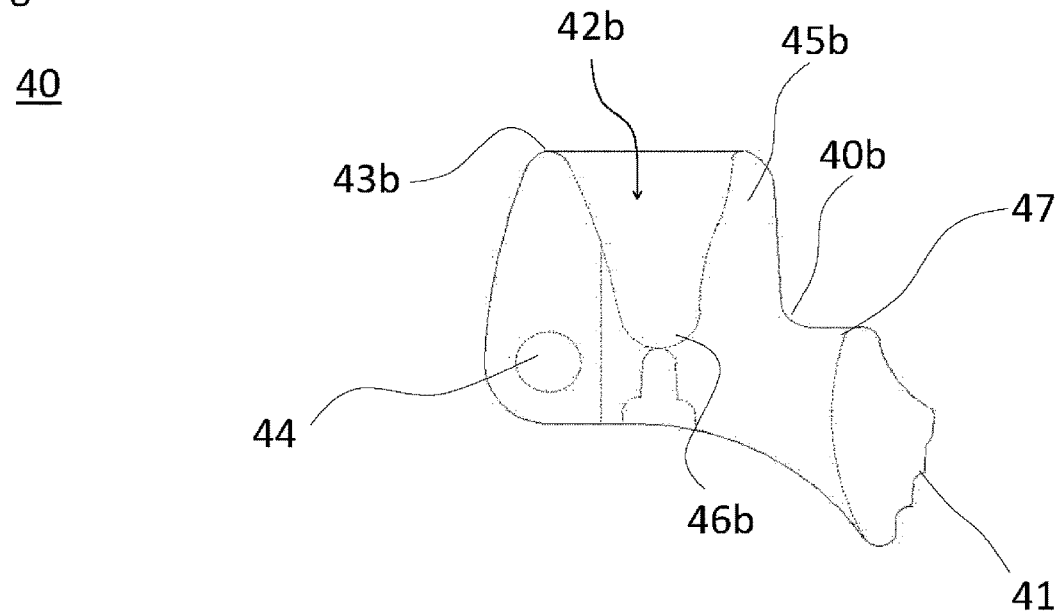
FIG. 10B is a left side view of the locking member.

FIG. 10A is a plan view of the locking member 40, and FIG. 10B is a left side view of the locking member 40. The locking member 40 has a bilaterally symmetrical shape overall, and has a side wall 40*a* extending upward from a right end of the lever portion 41, and a side wall 40*b* extending upward from a left end of the lever portion 41. Front portions of the side walls 40*a* and 40*b* are provided with protrusions 43*a* and 43*b* whose leading end portions each have an arc shape in a side view, and these leading end portions are respectively received by the recessed 35*a* and 35*b* of the above-described seesaw member 30. A space T1 is formed in front of the lever portion 41 between the side walls 40*a* and 40*b*. As will be described later, an interval between the side walls 40*a* and 40*b* is larger than the width of the rear end portion 33 of the seesaw member 30 in the right-left direction, and the rear end portion 33 of the seesaw member 30 enters the space T1 (see FIG. 12B).

Rear portions of the side walls 40*a* and 40*b* are provided with protrusions 45*a* and 45*b* that are spaced rearward from the above-described protrusions 43*a* and 43*b* that respectively constitute the front portions of the side walls 40*a* and 40*b*. These protrusions 43*a*, 43*b*, 45*a*, and 45*b* all protrude upward in the closed state of the opening S2 shown in FIG. 12A. Also, a groove portion 42*a* having a bottom portion 46*a* shown in FIG. 10 is formed between the right protrusions 43*a* and 45*a*. Similarly, a groove portion 42*b* having a bottom portion 46*b* is formed between the left protrusions 43*b* and 45*b*. The upper end of the lever portion 41 functions as a pressing portion 47 that holds the pressed portion 36 of the seesaw member 30 in the open state of the opening S2 shown in FIG. 12B.

As shown in FIGS. 10 and 12, the locking member 40 has a round columnar shaft portion 44 between the side walls 40*a* and 40*b*, or more specifically, between the protrusions 43*a* and 43*b*. The shaft portion 44 is received by a bearing portion 51 formed between the wall portions 2*a* and 2*b* at the upper end of the gripping portion 50. The bearing portion 51 has a shape in which an upper portion of the cylinder having a center axis extending in the right-left direction is cut out therefrom, and the shaft portion 44 is inserted into an internal space defined by the bearing portion 51 via the cut-out portion. By pushing up or pressing down the lever portion 41, the locking member 40 can swing using the shaft portion 44 engaged with the bearing portion 51 as a rotation axis. Note that a direction in which the lever portion 41 is pushed up refers to a direction in which the valve body 31 moves away from the valve seat 22*c* (a clockwise direction in FIG. 12). In contrast, a direction in which the lever portion 41 is pressed down refers to a direction in which the valve body 31 approaches the valve seat 22*c* (a counterclockwise direction in FIG. 12).

Figure 11:
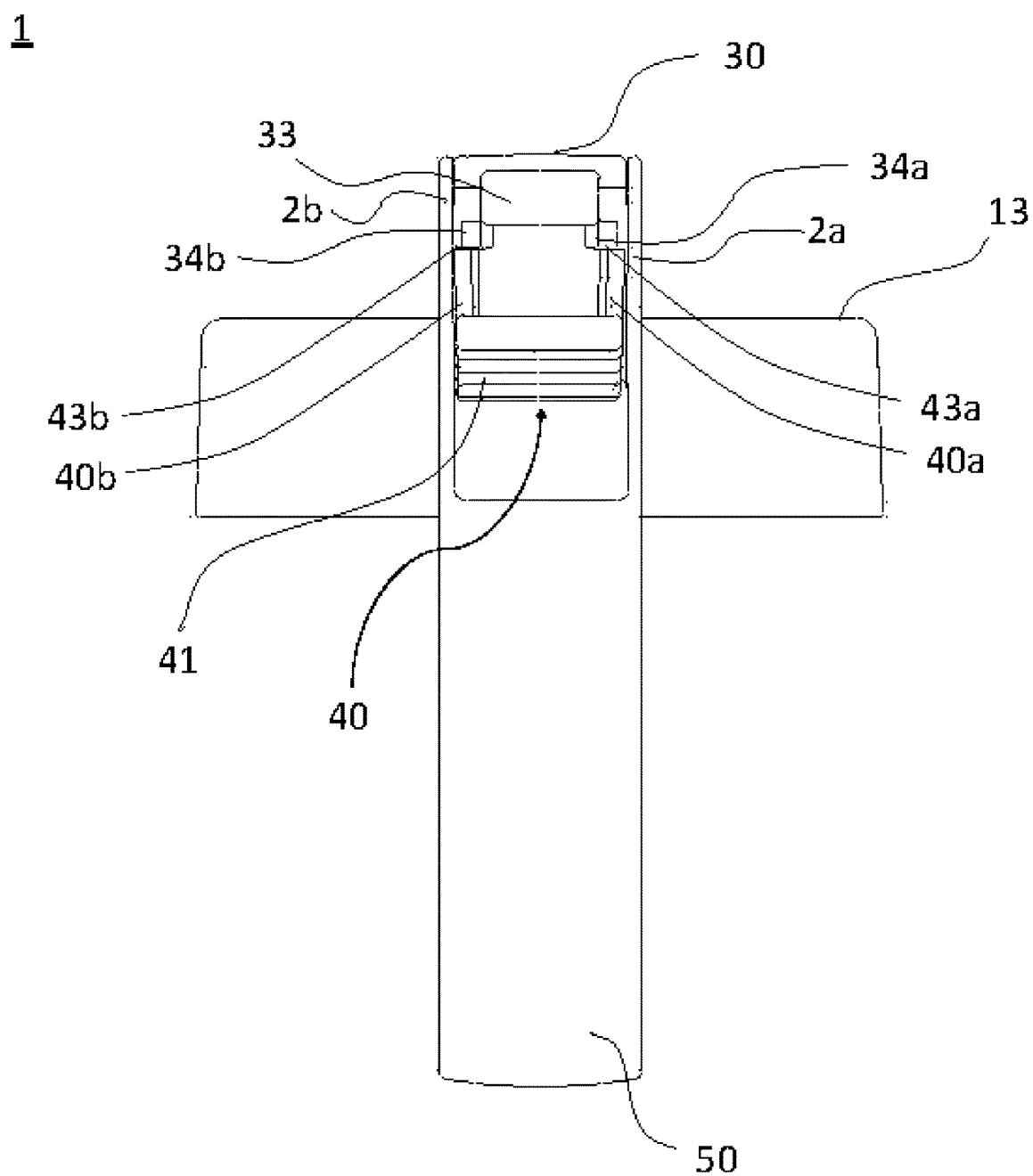
FIG. 11 is a back view of the lid body.

FIG. 11 is a back view of the lid body 1 in the closed state. The locking member 40 is disposed to be held in the right-left direction between the wall portions 2*a* and 2*b* together with the seesaw member 30, on the lower side of the seesaw member 30. Also, as shown in FIG. 11, the lever portion 41 is provided with a plurality of indentations extending in the right-left direction, and thus a finger of the user is unlikely to slip, and the user can easily apply a force to the locking member 40.

Figure 12A:
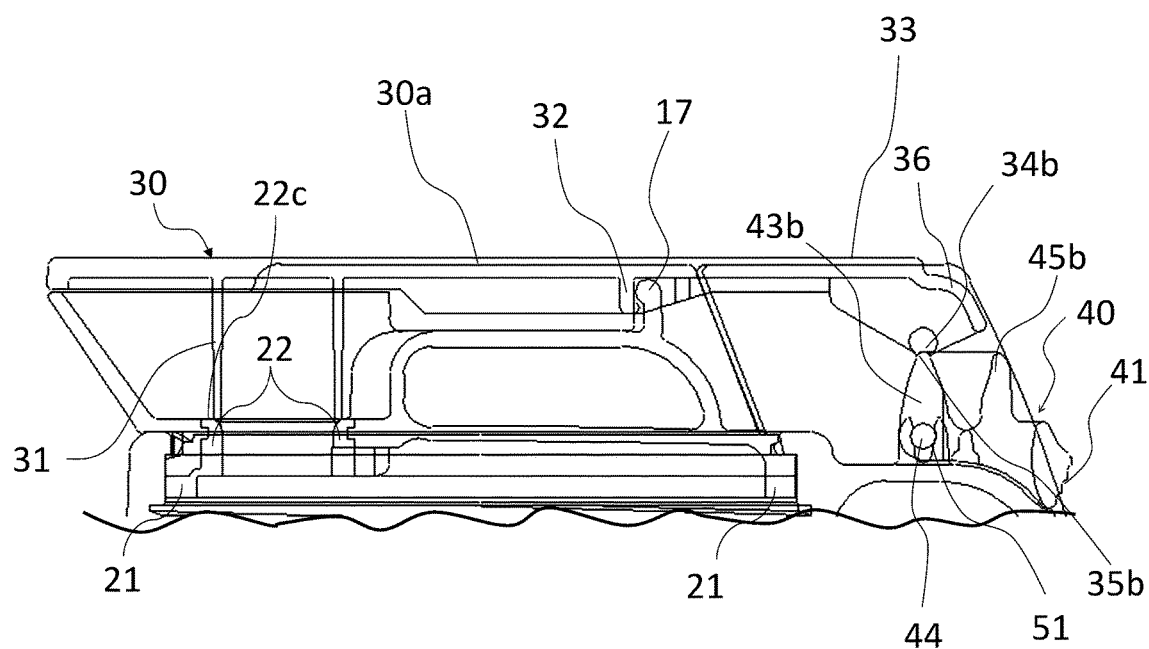
FIG. 12A is a diagram illustrating a closed state.

FIG. 12A is a see-through side view of a water stopping mechanism in the closed state of the opening S2. In the closed state, the main body portion 30*a* of the seesaw member 30 is horizontally supported from the bottom by the claw portion 17 and the protrusions 43*a* and 43*b* of the locking member 40. The protrusions 43*a* and 43*b* support the rear end portion 33 of the seesaw member 30, engage with the recesses 35*a* and 35*b* of the seesaw member 30, and lock the rear end portion 33. This locking is not released unless an external force is applied thereto to an extent that the columnar bodies 34*a* and 34*b* and the protrusions 43*a* and 43*b* undergo elastic deformation at a certain level or more via the lever portion 41. Thus, even if the beverage container 100 is placed with the side surface portions 202*c* or 202*d* of the container main body 200 oriented vertically downward, the valve body 31 continues to be in tight contact with the valve seat 22*c*, and thus the liquid-tight state of the opening S2 can be maintained.

Figure 12B:
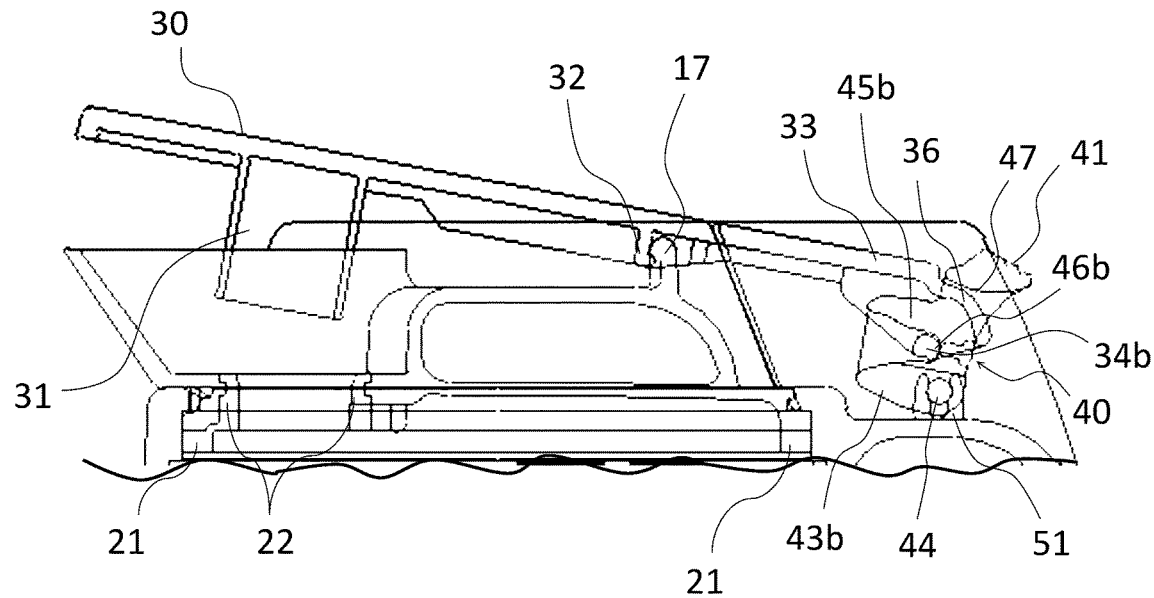
FIG. 12B is a diagram illustrating an open state.

FIG. 12B is a see-through side view of the water stopping mechanism that is locked in the open state. In order to release the locking of the closed state and keep the opening S2 open, the user grips the griping portion 50 with one hand and applies a force for pushing upward the lever portion 41 with the thumb of the hand. Then, the locking member 40 starts to rotate using the shaft portion 44 as a rotation axis, engagement between the recesses 35*a* and 35*b* and the protrusions 43*a* and 43*b* is released, and the seesaw member 30 starts to swing such that the rear end portion 33 moves downward and the valve body 31 moves upward. If the lever portion 41 is further pushed up, the rear end portion 33 of the seesaw member 30 enters the space T1 located between the side walls 40*a* and 40*b* of the locking member 40. Simultaneously, the columnar bodies 34*a* and 34*b* of the seesaw member 30 respectively enter the groove portions 42*a* and 42*b* of the locking member 40. If the lever portion 41 is pushed up to a position at which the pressing portion 47 of the locking member 40 holds the pressed portion 36 of the seesaw member 30, the columnar bodies 34*a* and 34*b* engage with the innermost bottom portions 46*a* and 46*b* of the groove portions 42*a* and 42*b* and are locked thereto. In this manner, the seesaw member 30 can be maintained in a state in which the opening S2 is open.

3. Method for Using Beverage Container

If a beverage such as tea or water is to be stored in the beverage container 100 provided with the lid body 1, first, the lid body 1 is detached from the container main body 200 by rotating the lid body 1. Then, a beverage is poured into the container main body 200 via the upper opening S1 of the container main body 200. After the beverage has been poured, the lid body 1 is tightly fixed to the container main body 200 by rotating the lid body 1 in a direction opposite to the previous direction.

At this time, the inside of the container main body 200 is kept liquid-tight by the above-described sealing mechanism and locking mechanism. Thus, even if the beverage container 100 is placed horizontally, for example, the beverage contained in the container main body 200 does not leak out. Thus, even if there is no space for placing the beverage container 100 vertically in a refrigerator, the beverage container 100 can be stored in the refrigerator in a horizontal orientation. Note that, as shown in FIG. 2, the width of the lid body 1 in the right-left direction is in a range of the width of the container main body 200 in the right-left direction. Thus, the beverage container 100 can be placed horizontally in a stable state as a result of the side surface portions 202*c* and 202*d* that have a substantially planar shape being oriented vertically downward.

When a beverage is to be poured out from the beverage container 100, the user first grips the gripping portion 50 with a hand, and pushes upward the lever portion 41 that protrudes rearward from the upper portion of the gripping portion 50 with the thumb of the hand. Then, the user confirms that a click sound is made and the columnar bodies 34*a* and 34*b* of the seesaw member 30 are respectively locked to the groove portions 42*a* and 42*b* of the locking member 40, and then the user releases the thumb from the lever portion 41. Then, the user tilts the beverage container 100 while gripping the gripping portion 50 to pour the beverage into a cup or the like via the spout portion 15. After the beverage has been poured, the user applies a downward force with the thumb of the hand to the lever portion 41 while gripping the gripping portion 50 to release the locked state. When the lever portion 41 is directly pressed downward with the thumb, the seesaw member 30 is oriented horizontally, and the protrusions 43*a* and 43*b* of the locking member 40 are locked to the recesses 35*a* and 35*b*, the valve body 31 comes into tight contact with the valve seat 22*c* and seals the opening S2. As a result, the inside of the container main body 200 is kept liquid-tight again, and the beverage container 100 can be stored in the refrigerator in various orientations.

Also, when the user is to clean the beverage container 100, the user rotates the lid body 1 to detach the lid body 1 from the container main body 200. As a result, the lid main body 11 and the seal portion 20 can be easily cleaned together from the side of the inner surface 14 of the lid body 1. With the container main body 200, a hand or a sponge provided with a handle can be inserted into the container main body 200 via the relatively wide upper opening S1, and the inside of the container main body 200 can be cleaned directly.

4. Characteristics (1)

In the above-described embodiment, the first seal portion 21 serves as a mechanical packing for sealing the upper opening S1, and the second seal portion 22 serves as a mechanical packing for sealing the opening S2. Also, the first seal portion 21 and the second seal portion 22 are formed as a single body from the same material, and are also formed as a single body with the lid main body 11 that is made of a different material. Thus, there is no need to provide a mechanical packing for sealing the upper opening S1 and a mechanical packing for sealing the opening S2 as separate components of the lid main body 11, and the labor of setting mechanical packings when the lid body 1 is attached to the container main body 200 can be omitted.

Also, there is no gap that water, dirt, or the like can enter, between the first seal portion 21, the second seal portion 22, and the lid main body 11. Also, the lid body 1 and the seal portion 20 can be cleaned together at the time of cleaning, and thus a cleaning operation is simplified and the labor of detaching mechanical packings one-by-one and cleaning the mechanical packings is eliminated. Also, the concern of losing a mechanical packing that detached at the time of cleaning is eliminated. Also, because the first seal portion 21 and the second seal portion 22 are formed from the same material and are continuous with each other, the material can be poured into a molding mold or the like in a process for molding the seal portion 20 simultaneously, and thus the molding process can be simplified.

(2)

In the above-described embodiment, when an operation is performed to push up the lever portion 41, the seesaw member 30 swings and the opening S2 that serves as the spout opens. That is, the spout can be opened by an operation for pushing up the lever portion 41. Thus, the risk that the spout will erroneously open when an object or the like unexpectedly comes into contact with the rear end portion 33 of the seesaw member 30 is reduced.

Note that, in the above-described embodiment, the lever portion 41 is disposed on the lower side of the rear end portion 33 of the seesaw member 30, and the valve body 31 is disposed on the front end portion 37 side with respect to the fulcrum portion of the seesaw member 30. When a user looks at such a seesaw member 30, in order to move the valve body 31 to the opening position, the user intuitively thinks to rotate the seesaw member 30 in a direction in which the valve body 31 is pushed up from the valve seat 22*c*, that is, to press down the lever portion 41. However, here, the spout is opened by operating, in this manner, the lever portion 41 in a direction opposite to the operation direction that is intuitively thought. Thus, this makes the user perform a conscious operation, and is likely to prevent the user from erroneously opening the spout.

Also, the lid body 1 of the above-described embodiment includes the above-described seal portion 20 and the locking mechanism by which the sealed state of the spout can be locked, and thus the beverage container 100 can be placed horizontally.

5. Variations

Although one embodiment of the present invention was described above, the present invention is not limited to the above-described embodiment, and various changes can be made without departing from the gist thereof. The following changes can be made, for example.

5-1

The shapes of the arm portions 23*a* and 23*b* of the second seal portion 22 are not limited to the above-described shapes, and can be various shapes. Also, a configuration may be adopted in which the second seal portion 22 has a ring shape that is continuous with the first seal portion 21 without forming an arm portion on the second seal portion 22.

5-2

Although the lid body 1 according to the above-described embodiment is used for the beverage container 100 that can be placed horizontally, a beverage container for which the lid body 1 is used is not limited to the above-described beverage container. The lid body 1 can be used for a beverage container that is not envisioned as being placed horizontally, for example.

5-3

Although, in the above-described embodiment, the recesses 35*a* and 35*b* are formed in the columnar bodies 34*a* and 34b and the recesses 35a and 35b are configured to respectively receive the leading ends of the protrusions 43a and 43b, a configuration may be adopted in which protrusions are formed on the columnar bodies 34a and 34b and the protrusions are respectively received by recesses formed in the leading ends of the protrusions 43a and 43b.

LIST OF REFERENCE NUMERALS

1 Lid body
11 Lid main body
12 Cylindrical portion
12a Screw portion
13 Upper surface portion
14 Inner surface
15 Spout portion
16a, 16b Wall
20 Seal portion
21 First seal portion
21a Lower surface
22 Second seal portion
22a Lower surface
22b Outer circumferential surface
22c Valve seat (upper surface)
23a, 23b Arm portion
24 Notch portion
25 Recess
30 Seesaw member
31 Valve body (plug)
33 Rear end portion (first end portion)
37 Front end portion (second end portion)
40 Locking member
41 Lever portion
50 Gripping portion
100 Beverage container
200 Container main body
202a to 202d Side surface portion
203 Cylindrical portion (circumferential edge portion)
203a Screw portion
S1 Upper opening
S2 Opening (spout)

The invention claimed is:

1. A lid body that is to be attached to a beverage container main body having a cylindrical edge portion that defines an opening, the lid body comprising:
   a lid main body that is detachably fixed to the cylindrical edge portion of the opening to cover the opening and that includes an inner surface that faces an inner portion of the beverage container main body, and a circumferential edge portion that defines a spout for pouring a beverage contained in the beverage container main body;
   a ring-shaped first seal portion that is formed so as to be undetachable from the inner surface, and is configured to seal a gap located between the cylindrical edge portion of the opening and the lid main body by being in tight contact with the cylindrical edge portion of the opening;
   a second seal portion that is formed integrally with the first seal portion and formed using a material that is the same as a material of the first seal portion, and is formed so as to be undetachable from the circumferential edge portion of the spout; and
   a plug that is disposed to be movable between a closing position for sealing the spout by being in tight contact with the second seal portion and an opening position for bringing the inside and the outside of the beverage container main body into communication with each other via the spout, wherein
   the spout is defined at a position away from the center of the opening, and
   the second seal portion extends inward in the radial direction from the first seal portion and is at a position away from the center of the first seal portion.

2. The lid body according to claim 1, wherein the first seal portion and the second seal portion are formed using a material that is different from a material of the lid main body.

3. The lid body according to claim 1, wherein
   the lid main body and the plug are made of a resin, and
   the first seal portion and the second seal portion are made of an elastomer.

4. The lid body according to claim 2, wherein
   the lid main body and the plug are made of a resin, and
   the first seal portion and the second seal portion are made of an elastomer.

5. A beverage container comprising:
   a beverage container main body having a cylindrical edge portion that defines an opening; and
   the lid body according to claim 1 that is attached to the beverage container main body.

6. A beverage container comprising:
   a beverage container main body having a cylindrical edge portion that defines an opening; and
   the lid body according to claim 2 that is attached to the beverage container main body.

7. A beverage container comprising:
   a beverage container main body having a cylindrical edge portion that defines an opening; and
   the lid body according to claim 3 that is attached to the beverage container main body.

* * * * *